Figure 1:
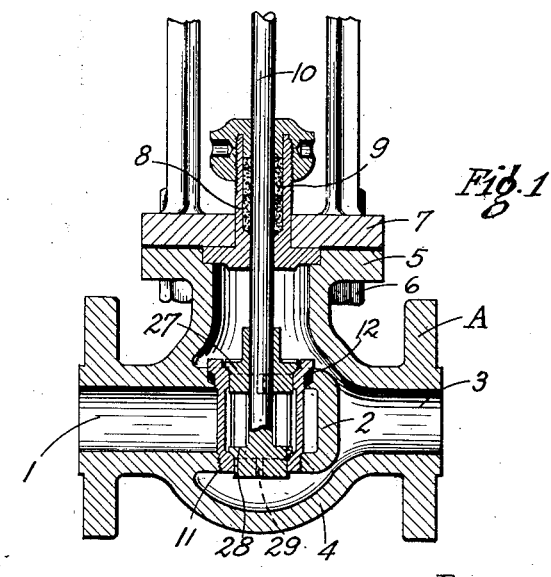

Aug. 16, 1932.   H. J. MASTENBROOK   1,872,157

VALVE CAGE

Filed Aug. 5, 1929

Inventor

HENRY J. MASTENBROOK

By Richey & Watts

Attorneys

Patented Aug. 16, 1932

1,872,157

UNITED STATES PATENT OFFICE

HENRY J. MASTENBROOK, OF CLEVELAND, OHIO, ASSIGNOR TO THE SWARTWOUT COMPANY, OF CLEVELAND, OHIO, A CORPORATION OF OHIO

VALVE CAGE

Application filed August 5, 1929. Serial No. 383,653.

This invention has to do with valves and is particularly concerned with that type of valve having a plurality of seats with which co-operate a corresponding number of valve closure members or discs which are carried by a single operating member or stem.

Valve mechanisms of the type noted are finding considerable use as boiler feed water valves and the like, and such usage is characterized by the controlling of fluids under relatively high pressures and varying high temperatures. The very nature of the service encountered by the valves requires that there be an extreme nicety of fit between the discs and the seats to prevent leakage, which might occur under the high pressure of the fluid. In present day practice, individual valve seats are provided with which co-operate the discs. Inasmuch as the discs are carried by a single stem, some little difficulty is experienced in obtaining a proper seating of the several discs in their respective seats. A spacing apart of the one requires that the other be spaced apart exactly the same distance in order to afford the necessary sealing.

With the foregoing in mind, this invention has in view the proposition of including a plurality of valve seats in a cage structure. With such an arrangement the location of the seats may be very accurately determined prior to the assembly of the cage in the valve. The provision of a valve cage in a construction of the type noted gives rise to certain questions which must be taken care of in order that the valve operate properly under varying service conditions.

The mounting of the cage in the proper fluid passage must necessarily be fluid tight in order to prevent leakage past the cage. Inasmuch as the valve seats are very often made from a different metal than that employed in the construction of the walls that define the fluid passage, expansion under variations in temperatures must be accommodated without creating any leakage effects.

Having taken recognition of these conditions, I propose to provide a valve cage having a plurality of seats and which cage is mounted in the fluid passage by connections involving at least one packed joint. With one packed joint there may be employed a second, a metal to metal or ground joint. By including a packed joint in the construction, the ground joint may be firmly set up as it is in no way affected by the establishment of the packed joint nor vice versa. If the cage were to be mounted in a manner involving a plurality of ground joints, then the same difficulties would be experienced as in the providing of a plurality of individual valve seats. A further advantage inherent to a mounting of a valve cage including a packed joint is the relative movement provided between the cage and the construction on which it is mounted, which may be caused by temperature changes or other causes.

With these and other objects and advantages in view as will in part become apparent and in part be hereinafter stated, my invention comprises certain novel constructions, combinations, and arrangements of parts as will be subsequently specified in the claims.

Figure 2:
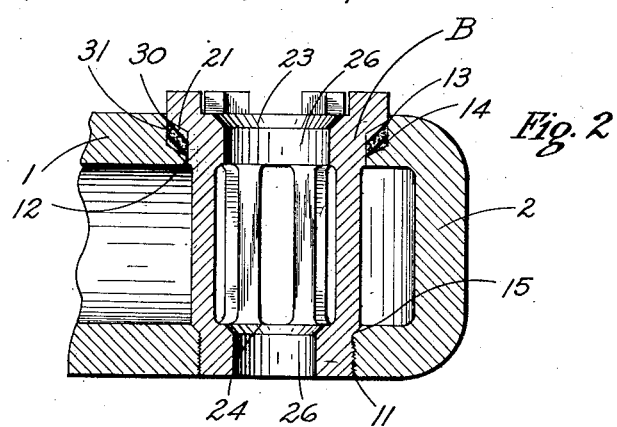
Figure 3:
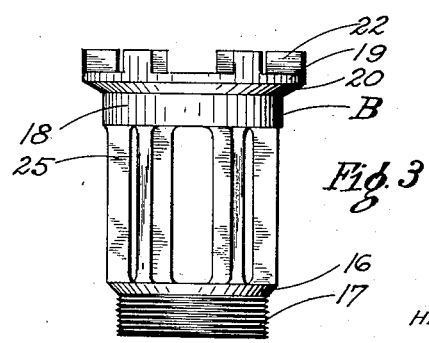

Figure 1 is a section taken through a pressure governor mechanism including a valve cage made in accordance with this invention; Figure 2 is an enlarged detailed showing in section bringing out the mounting of the cage in the fluid passage and Figure 3 is a detailed illustration in elevation of the cage per se.

While a preferred specific embodiment of the invention is herein set forth, it is to be understood that I am not to be limited to the exact constructions illustrated and described because various modifications of these details may be provided in putting the invention into practice within the purview of the appended claims.

Referring now to the drawing, a body of a valve in which a cage provided by this invention may be used is shown in Figure 1 and designated A. This body includes a fluid passage referred to as 1, which terminates in a closed wall as shown at 2. A second fluid passage 3 has an enlarged portion defined by the spherical wall 4, which surrounds the closed end of the conduit 1. Opposite openings in the walls of the latter establish communication between the passages 1 and 3 and 10 the flow of the fluid through these openings is controlled by the valve mechanism to be hereinafter more fully described. The body A, which may be a steel casting, is formed with a flange 5 and connected thereto, by any suitable means, such as the bolts and nuts indicated at 6, is a yoke construction 7. The latter includes a gland 8, which, together with packing 9, provides a sealed joint between the bottom portion of the yoke 7 and a valve stem 10 extending therethrough.

In the present instance, the walls of the passage 1 are shown as provided with two openings, which are located diametrically opposite one another and which are referred to by the reference characters 11 and 12. It is noted that the opening 12 is counter-bored as shown at 13 and the counter-bored portion is connected with the remainder of the opening by a truncated conical surface 14, which preferably is at an angle of about sixty degrees with the cylindrical walls 12 and 13. The opening 11 is threaded and at the inner extremity thereof is provided with a conical ground surface 15.

A valve cage referred to generally as B, has a ground surface 16 that is complemental to the ground surface 15 and co-operates with the latter to provide a sealed connection. The cage B is positioned in the openings 11 and 12 by screwing the threaded end 17 of the cage B into the threaded opening 11. The upper portion of the cage B is provided with a cylindrical surface 18 of substantially the same diameter as the opening 12 and this cylindrical surface engages the walls of the opening 12 when the cage is properly in position. Above the cylindrical surface 18 the cage B is formed with a flange 19 having a truncated conical surface 20 that connects it with the cylindrical surface 18. The surface 20 is preferably inclined at the same angle with respect to the cylindrical surface 18 as is the surface 14 with respect to the cylindrical surface 13, to wit: sixty degrees. When the parts are assembled the surfaces 13, 14, 18 and 20 define a packing chamber preferably of the shape of a parallelogram and which is referred to as 21. The flange 19 may be formed with any suitable wrench engaging means, such as the spaced lugs indicated at 22.

The cage B may be of any preferred metal, such as Monel metal, and is formed with valve seats 23 and 24, which are separated by a slotted construction of the cage indicated as 25. It is noted that the valve seat 24 is of somewhat smaller diameter than the seat 23. This permits the disc which is to engage the seat 24 to pass through the opening surrounded by the seat 23. Associated with each of the valve seats 23 and 24 are guide means in the form of cylindrical surfaces 26, which extend on one side of the seats 23 and 24 and terminate at the latter.

The valve stem 10 is preferably of the same material as the cage, in this case Monel metal, and is formed with valve discs 27 and 28, each of which have conical surfaces complemental to the seats 23 and 24. Each of the discs 27 and 28 is provided with guide means in the form of cross-arms 29, which co-operate with the cylindrical surfaces 26 to properly guide the discs 27 and 28 in their operations. The discs 27 and 28 may be integral or separate from the stem 10 as desired. In the present instance, disc 28 is shown as being integral with the stem 10, while the disc 27 and its associated guides, are separate therefrom and connected thereto.

Located in the packing chamber 21 is some suitable packing for sealing the connection between the upper part of the cage B and the walls of the fluid passage 1. In the present instance this packing has taken the form of conical copper rings 30, which are spaced apart by some fibrous packing material, such as asbestos 31. The packing is defined by cylindrical surfaces, which engage the surfaces 13 and 18 and the truncated surfaces of the copper rings 30, which normally are largely free from engagement with the surfaces 14 and 20. The upper peripheral edge of the packing ring which comprises the edge of the copper plate 30, fits in the corner or groove created by the surfaces 14 and 20, while the inner lower edge of the bottom ring 30 fits in the corner between the surfaces 14 and 18. The reason for this disposition of the packing in the chamber is that a very slight amount of movement of the cage B with respect to walls of the conduit 1 will cause the surfaces 14 and 20 to approach one another, whereby the packing will be pressed and/or expanded against the cylindrical walls 13 and 18 to provide a fluid tight connection.

In the construction above described the relation between the valve seats 23 and 24 and the valve discs 27 and 28 is determined before the cage B is mounted in the body A. Hence, a very accurate fitting of the discs and seats may be obtained. The housing B is then mounted in the walls of the fluid passage by screwing the threaded portion 17 into the threaded bore 11 to bring the ground surfaces 15 and 16 into engagement, whereby fluid-tight seal between the wall of the housing B and the walls of the chamber 1 is set up. In the meantime, the packing in the chamber 21 has been affected as above noted by the relative approaching movements of the surfaces 14 and 20 to be expanded and tightly pressed against the cylindrical surfaces 18 and 14 to seal the connection at the upper portion of the cage B.

As the cage B is herein described as being of a different metal from the body A, temperature changes ordinarily will effect different changes in the dimensions of these parts. This is accommodated by the packed joint described.

An advantage provided by the particular type of packed joint shown is that a relatively small force exerted on the wrench engaging means 22 will be sufficient to compress the packing to seal the connection to prevent leakage of fluid under comparatively great pressure. Thus it will appear that a tight seal is maintained under all conditions; that the flexibility inherent to the packed joint maintains the seal while permitting expansion and contraction between the cage and the valve body; that the design and arrangement of parts is eminently simple and susceptible to economic manufacture; that assembly may be rapid; that replacement and repair may be very readily accomplished.

Modifications and changes within the scope of my invention may occur to those skilled in the art and while I have described a preferred embodiment of my invention I do not care to be so limited or in any manner other than by the claims appended hereto.

I claim:

1. In mechanism of the class described, the combination, with a wall defining a fluid passage and having openings therein, of a cage structure in the openings, the wall around one of the openings and the cage being cut away to provide a chamber and packing in the chamber, the packing being inclined within the chamber and having sides spaced from the wall of said chamber so that relative movement between the cage and wall to decrease the size of the chamber causes a relative radial expansion of the packing to seal the connection between the cage and wall.

2. Valve mechanism comprising, in combination, a conduit formed with a pair of openings, a valve cage in the openings and having a valve seat corresponding to each opening, a pair of discs carried by a stem and co-operating with the seats, the conduit and cage each being formed with a cylindrical and conical surface which collectively define a packing chamber, and a packing ring in the chamber having conical surfaces of different pitch from those of the chamber.

3. The combination of a valve having spaced partition walls with aligned openings, a valve cage adapted to be seated in said openings, said cage having a ground joint for engagement with the wall of one of said openings and said cage at the other of said openings being formed to provide an annular space of parallelogram cross-section between it and the wall of the opening and a packing ring disposed in said space also of parallelogram cross-section and having one pair of angles smaller than the corresponding pair of angles of said space.

4. In combination, a valve having spaced partition walls with a pair of aligned openings, a valve cage in said openings, one of said walls and said cage each being formed with a cylindrical and conical surface which collectively define a packing chamber, and a packing ring in said chamber having conical surfaces of different pitch from those of the chamber.

5. In combination a valve having a pair of spaced partition walls with aligned openings, a valve cage being in threaded engagement with the wall surrounding one of said openings and forming a ground joint with the periphery of said opening, the wall surrounding the other opening and the exterior surface of the cage adjacent thereto defining between them a closed annular space, and a packing ring in said space of less cross-sectional area than the least cross-sectional area of said space and deformed to form a tight joint by being compressed between the cage and the wall surrounding the opening.

In testimony whereof I hereunto affix my signature this 29th day of July, 1929.

HENRY J. MASTENBROOK.